United States Patent
Kadono et al.

[11] Patent Number: 5,147,600
[45] Date of Patent: * Sep. 15, 1992

[54] GRID FOR NUCLEAR FUEL ASSEMBLY

[75] Inventors: Hiroaki Kadono; Akio Oriuchi; Koichi Tominaga, all of Ibaraki, Japan

[73] Assignee: Mitsubishi Nuclear Fuel Co., Tokyo, Japan

[*] Notice: The portion of the term of this patent subsequent to Jul. 28, 2009 has been disclaimed.

[21] Appl. No.: 619,971

[22] Filed: Nov. 30, 1990

[30] Foreign Application Priority Data

Dec. 6, 1989 [JP] Japan ................. 1-316932

[51] Int. Cl.$^5$ ................. G21C 3/34
[52] U.S. Cl. ................. 376/462; 376/438; 376/442
[58] Field of Search ................. 376/462, 442, 453, 438

[56] References Cited

U.S. PATENT DOCUMENTS

| | | | |
|---|---|---|---|
| 3,791,466 | 2/1974 | Patterson et al. | 376/442 |
| 3,920,516 | 11/1975 | Kmonk et al. | 376/441 |
| 4,692,303 | 8/1987 | Osborne | 376/446 |
| 4,772,447 | 9/1988 | Manson et al. | 376/441 |
| 4,800,061 | 1/1989 | Shallenberger et al. | 376/261 |
| 4,875,051 | 10/1989 | Duncan et al. | 376/438 |
| 4,888,152 | 12/1989 | Razdfindrasala | 376/462 |

Primary Examiner—Brooks H. Hunt
Assistant Examiner—Meena Chelliah
Attorney, Agent, or Firm—Oblon, Spivak, McClelland, Maier & Neustadt

[57] ABSTRACT

There is disclosed a grid in a nuclear fuel assembly for supporting fuel rods and thimbles, which includes a plurality of elongated straps intersecting perpendicularly with each other to define a plurality of first grid cells for supporting the fuel rods and a plurality of second grid cells for supporting the thimbles. Each grid cell has a prescribed intervening distance defined between the opposed straps. A cylindrical sleeve is arranged on at least one of the opposite ends of the strap portions defining the second grid cell and has an inner diameter generally identical to the intervening distance. There is provided an engaging unit for securing each sleeve to the strap portions. The engaging unit includes at least one first engaging portion provided on the strap portions and at least one second engaging portion provided on the sleeve. The first and second engaging portions are held in resilient engagement with each other.

15 Claims, 8 Drawing Sheets

GRID FOR NUCLEAR FUEL ASSEMBLY

BACKGROUND OF THE INVENTION

1. Field of the Invention

The present invention relates to a grid in a nuclear fuel assembly for supporting a plurality of fuel rods, control-rod guide thimbles and so on.

2. Prior Art

FIG. 9 of the attached drawings depicts an example of a nuclear fuel assembly which is mounted on a nuclear reactor such as a pressurized water reactor or the like.

In this assembly, a pair of top and bottom nozzles 1 and 2 are arranged in vertically spaced relation to each other so as to face each other. A plurality of zircaloy guide thimbles 3 such as control-rod guide thimbles and measuring-instrument guide thimbles are extended between and securely fixed to the top and bottom nozzles 1 and 2, and a plurality of grids 4 are secured to intermediate portions of these guide thimbles 3 in vertically spaced relation to each other.

As shown in FIGS. 10 and 11, each of the grids 4 includes a plurality of straps 6 assembled perpendicularly to each other to define a plurality of grid cells 5. A pair of dimples 9 and a pair of springs 10 for supporting a fuel rod 8 are formed on the wall surfaces 6a of the straps 6 of each grid cell 5 in opposed relation to each other. Furthermore, a plurality of sleeves 11 are securely fixed to the upper and lower opening ends of prescribed grid cells 5, respectively, for guiding the outer peripheries of the thimbles 3 to be inserted into the grid cells 4.

Each sleeve 11 is of an elongated cylindrical shape having an inner diameter generally identical to the intervening distance between the opposite straps of the grid cell 5, and as shown in FIG. 12, four openings 12 are formed in an outer peripheral surface 11a thereof in circumferentially equally spaced relation to one another, whereby four wall portions 11b are defined at the central portion thereof. For securing each sleeve 11 to a prescribed grid cell 5, the sleeve 11 is first inserted into the grid cell 5 through the upper or lower opening end in such a manner that its wall portions 11b are opposed to the corner portions 5a of the grid cell 5, and that the opposite ends of the sleeve 11 protrude from the upper and lower opening ends of the grid cell 5, and is then fixedly secured to the grid cell 7 by means of brazing or the like.

In the aforesaid grid 4, when inserted into the grid cell 5, the fuel rod 8 is caused to move while its outer peripheral surface is being clamped between the dimples 9 and the springs 10. Hence, there is a problem that the outer peripheral surface of the fuel rod 8 is scratched by the springs 10 and the dimples 9 along its longitudinal direction.

Therefore, a grid cell 20 of a construction as shown in FIGS. 13 and 14 is employed. In this grid 20, each of the elongated straps 21 has a plurality of cut-outs 22 formed therein so as to be spaced a predetermined distance from each other in a longitudinal direction of the strap 21, and a spring 24 is formed between each pair of adjacent cut-outs 22 in the strap 21 so as to project into a grid cell 23. In addition, a pair of dimples 26 are formed at respective positions in the widthwise direction of the strap 21, between which the spring 24 is located in such a manner as to project in a direction opposite to the spring 24.

For inserting a plurality of fuel rods 36 into the grid cells 23 in each of the grids 20, respectively, a deflecting jig 15 as shown in FIG. 15 is employed. This deflecting jig 15 is composed of a sleeve 33 divided circumferentially into the four sleeve pieces and a tapered pin 34 inserted into the sleeve 33 for axial sliding movement, and is first inserted into the grid cell 23. Then, the tapered pin 34 is drawn into the sleeve 33 to cause the four-divided sleeve pieces to be urged and moved outwardly, so that the springs 24 are deflected by these pieces as shown in FIG. 14. Then, an elongated key member 16 is inserted into a cut-out 27 from the side of the grid 20 to bring its hook 31 into engagement with a rib 25 of the strap, and while the spring 24 is maintained deflected by the key member 30, the deflecting jig 15 is released. Thereafter, the fuel rod 36 is inserted, and the key member 30 is released. Thus, with these procedures, the fuel rod 36 is not brought into sliding contact with the springs 24 and the dimples 26 during the insertion, so that no scratches are developed on the outer peripheral surface of the fuel rod 36.

However, in the case where the grid 20 of the aforesaid construction is employed, the conventional sleeve 11 as described above cannot be utilized. This is because when the sleeve 11 is secured to the grid cell 23, the wall portion 11b of the sleeve 11 prevents the hook 31 of the key member 16 from engaging with the rib 25 of the strap 21 in the grid 20.

In order to overcome the above problems, a short sized sleeve 40 as shown in FIG. 16 may be used. This sleeve 40 is prepared by cutting out a central portion of the sleeve 11 of FIG. 12 by a width A in a circumferential direction to divide the sleeve 11 transversely into two short parts. The short sleeve 40 thus prepared can be inserted into the grid cell 23 with its four short legs 40a being opposed to the corner portions of the grid cell 23 as shown in FIG. 16, and further the hook 31 can be easily engaged with the rib 25 by inserting the key member 16 into the space of the width A in the corner portion of the grid cell 23.

However, there is still a problem that when securing the short sleeve 40 to the grid cell 23, the short sleeve 40 may be shifted from the axis of the grid cell 23, and hence the thimbles 3 cannot be arranged properly. Moreover, the surface areas that can be used for brazing the short legs 40a of the sleeve 40 to the wall surfaces of the straps 21 of the grid cell 23 are relatively small, and hence the securing strength of the short sleeve 40 with respect to the grid 20 is unduly reduced.

SUMMARY OF THE INVENTION

It is therefore an object of the present invention to provide a grid in a nuclear fuel assembly, in which when a short sleeve is employed to permit the use of the deflecting jig and the key member, the short sleeve can be easily secured to the opening ends of the grid cell properly.

According to the present invention, there is provided a grid in a nuclear fuel assembly for supporting fuel rods and thimbles, comprising:

a plurality of elongated straps intersecting perpendicularly with each other to define a plurality of first grid cells for supporting the fuel rods and a plurality of second grid cells for supporting the thimbles, each of the grid cells having a prescribed intervening distance defined between the opposed straps, those portions of the straps defining a respective one of the grid cells having opposite ends defining opposite opening ends of the respective grid cell;

a plurality of cylindrical sleeves each arranged on at least one of the opposite ends of the strap portions defining the respective second grid cell and having an inner diameter generally identical to the intervening distance; and engaging means for securing each of the sleeves to the strap portions defining the second grid cell, the engaging means including at least one first engaging portion provided on the strap portions defining the second grid cell and at least one second engaging portion provided on the sleeve, the first and second engaging portions being held in resilient engagement with each other.

In the foregoing, when the sleeve is inserted in the second grid cell, the first engaging portion provided on the straps and the second engaging portion provided on the sleeve can be held in resilient engagement with each other. Therefore, in the grid of the invention, the sleeve can be firmly secured to the opening end of the grid cell.

Thus, in the present invention, a sleeve of such a type that a deflecting jig and a key member can be employed is used, and the sleeve can be secured to the grid cell perpendicular thereto without using any special tools. Furthermore, the securing strength of the sleeve can be increased as compared with the prior art grid in which the surface area for brazing is relatively small.

DESCRIPTION OF THE PREFERRED EMBODIMENTS OF THE INVENTION

Figure 1:
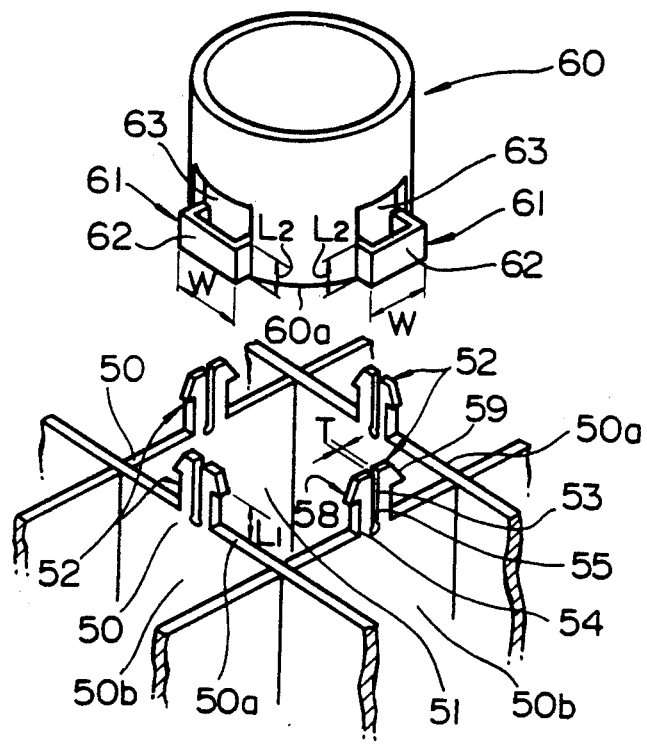
FIG. 1 is a fragmentary enlarged perspective view of a grid in accordance with a first embodiment of the present invention, but showing the state in which a short sleeve is not secured to a grid cell yet.
Figure 2:
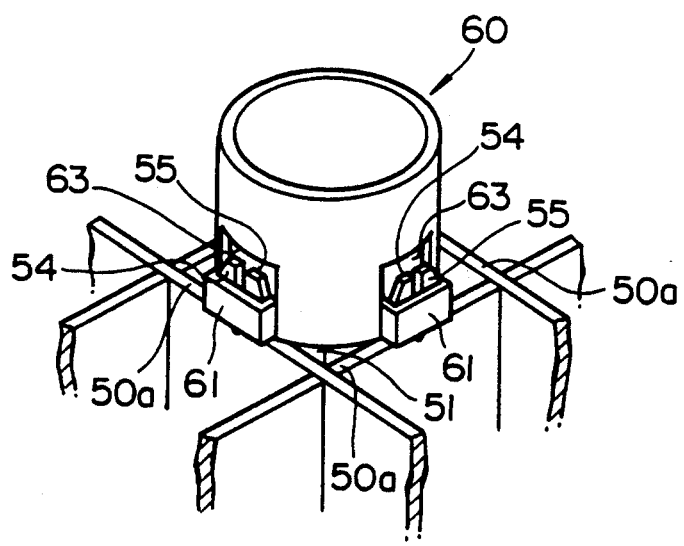
FIG. 2 is a view similar to FIG. 1, but showing the state in which the short sleeve is secured to the grid cell.

Referring first to FIGS. 1 and 2, there is shown a grid for a nuclear fuel assembly in accordance with a first embodiment of the present invention.

Figure 13:
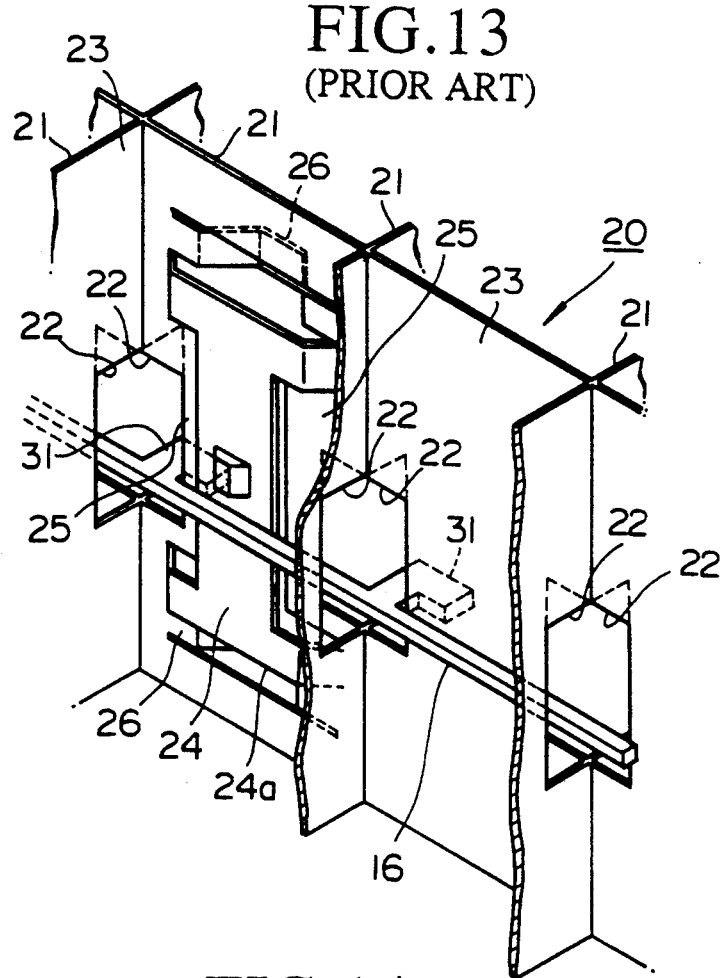
FIG. 13 is a fragmentary enlarged perspective view showing the inside of a modified prior art grid.
Figure 14:
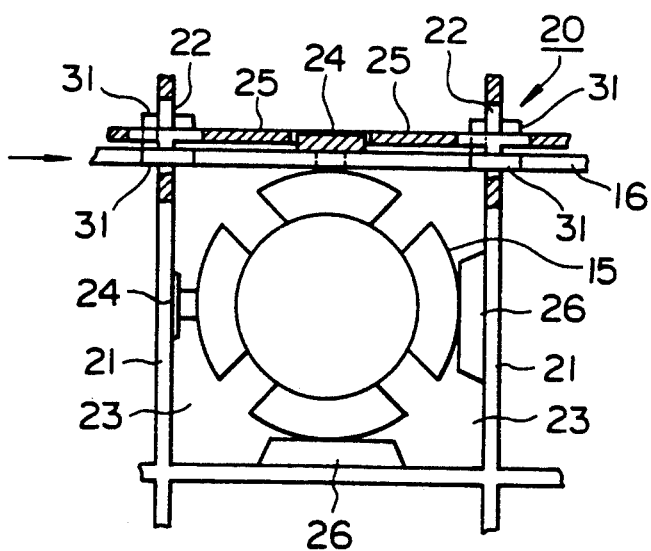
FIG. 14 is a top plan view of a grid cell of the grid of FIG. 13.
Figure 15:
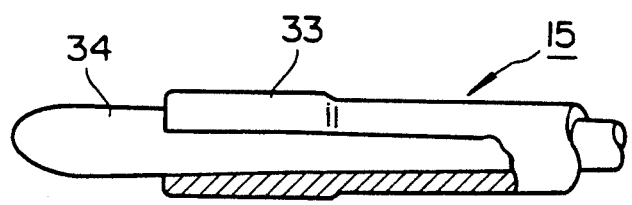
FIG. 15 is a partially cut-out perspective view of a deflecting jig.
Figure 16:
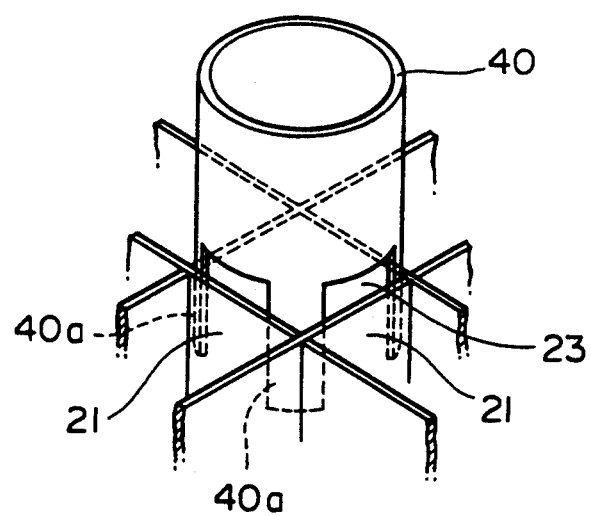
FIG. 16 is a perspective view showing a short sleeve secured to the grid.

The grid includes a plurality of elongated straps 50 of a strip sheet form assembled to each other to define a plurality of grid cells 51 which can be classified into first grid cells for supporting fuel rods and second grid cells for supporting thimbles. Although not shown, as is the case with the conventional grid shown in FIGS. 13 and 14, elongated cut-outs extending in a longitudinal direction of the straps 50 are formed in the wall portions of the straps 50, and a pair of dimples and a pair of springs for supporting the fuel rod are also formed thereon. Furthermore, each of the grid cells 51 has a prescribed intervening distance defined between the opposed wall portions of the straps 50, and those portions of the straps 50 defining a respective grid cell 51 have opposite ends defining opposite opening ends of the grid cell 51.

Four first engaging portions 52 are respectively formed on the central portions of the ends 50a of the strap portions defining a respective second grid cell 51. Each first engaging portion 52 is comprised of a pair of engaging segments 54 and 55 extending upwardly from the wall 50b and formed so as to define a slit or cut-out portion 53 of a predetermined width T therebetween, whereby the segments 54 and 55 are resiliently deformable towards each other. The engaging segments 54 and 55 respectively include hook portion 58 and 59 formed at their distal ends so as to face in the directions away from each other, and each hook portion 58, 59 has an inclined surface sloping toward the distal end toward the cut-out portion 53. In addition, as illustrated in FIG. 1, the distance between the bottom of the hook portion 58, 59 and the wall end 50a of the strap 50 is set to a predetermined length $L_1$.

Moreover, the grid includes a plurality of short cylindrical sleeves 60 having an inner diameter generally identical to the intervening distance between the opposite straps of the grid cell 51. Four second engaging portions or holding portions 61 are formed on the outer peripheral surface of the end portion of the sleeve 60 at prescribed positions corresponding to the first engaging portions 52, respectively. Each second engaging portion 61 includes a frame member 62 protruding outwardly of the sleeve. The frame member is of a channel shape as viewed longitudinally of the sleeve, and defines a holding space in which the aforesaid first engaging portion is inserted. In addition, a through opening 63 is formed above the frame member 62. With respect to the frame member 62, its width W is set so as to be smaller than the length between the hooks 58 and 59 of the engaging segments 54 and 55, and its height $L_2$ is set identical to the aforesaid length $L_1$ of the engaging segments.

In the foregoing, the first engaging portion 52 and the second engaging portion 61 constitute an engaging means for securing each of the sleeves to the strap portions defining the second grid cell 51.

When securing the short sleeve 60 to either the upper or lower opening end of the grid cell 51, the short sleeve 60 is first arranged in such a manner that the four frame members 62 correspond to the first engaging portions 52, respectively, and is moved toward the strap portions so that each first engaging portion 52 is inserted in the holding space of a respective second engaging portion 61. Thus, the inclined faces of the hook portions 58 and 59 are brought into abutting contact with the inner sides of the frame member 62, and the engaging segments 54 and 55 are resiliently deformed towards each other. Further, as shown in FIG. 2, when the bottom 60a of the short sleeve 60 touches the end face 50a, the engaging segments 54 and 55 are restored to their original positions. Thus, the hook portions 58 and 59 are caused to protrude from the frame member 62 and are held in engagement with the upper end thereof.

As described above, when the sleeve 60 is arranged in such a manner that the first engaging portions 52 and the second engaging portions 61 are opposed to one another, and is moved toward the strap portions so that each pair of engaging segments 54 and 55 are inserted into the holding space defined by a respective frame member 62, the pairs of engaging segments 54 and 55 are brought into engagement with the frame members 62, respectively. Therefore, the short sleeve 60 can be firmly secured to the strap portions of the grid cell 51.

In addition, inasmuch as the bottom 60a of the sleeve 60 is held in abutment with the four ends 50a of the straps portions, the short sleeve 60 can be arranged exactly perpendicularly to the wall ends 50a of the grid.

Figure 3:
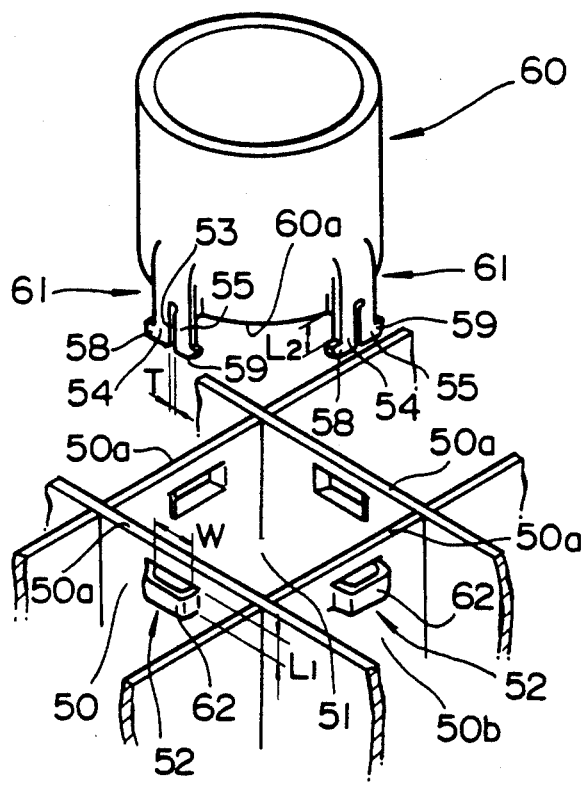
FIG. 3 is a view similar to FIG. 1, but showing a grid in accordance with a second embodiment of the invention.
Figure 4:
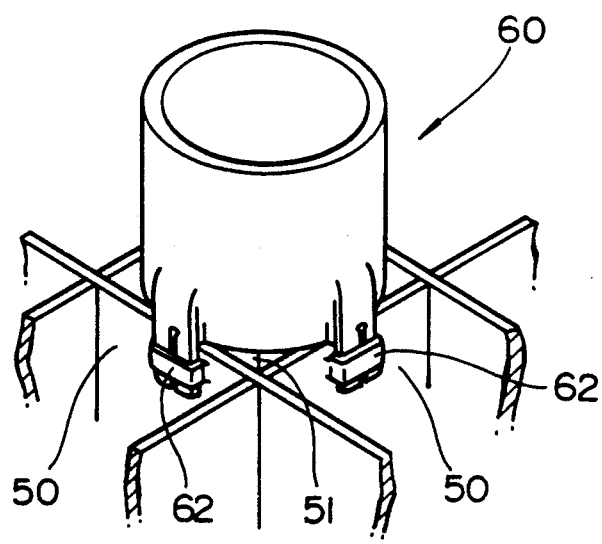
FIG. 4 is a view similar to FIG. 3, but showing the state in which the short sleeve is secured to the grid cell.

FIGS. 3 and 4 depict a grid in accordance with a second embodiment of the invention, in which the same reference numerals are used to designate the parts common with the previous embodiment to omit their explanations. In this embodiment, as easily seen from the drawings, the engaging segments and the frame members are formed on the reverse components as compared with the previous embodiment.

More specifically, the first engaging portions 52 defining holding spaces are formed on the strap portions of the second grid cell by punching openings in prescribed portions of the strap walls. Each first engaging portion protrudes outwardly from the second grid cell, and is comprised of a frame member 62 having a channel shape as viewed transversely of the strap and defining a vertically opening holding space.

Furthermore, the second engaging portions 61 are formed on the short sleeve 60, and each second engaging portion 61 is defined by a pair of elongated segments 54 and 55 extending vertically so as to protrude downwardly from the bottom of the sleeve.

The method for securing the short sleeve 60 to the grid cell 51 is basically the same as in the previous embodiment. Namely, the short sleeve 60 is first arranged such that the four second engaging portions 61 are opposed to the frame members 62, respectively, and is moved toward the strap portions so that each pair of engaging segments 54 and 55 are inserted into the holding space of a respective frame member 62. Thus, when the bottom 60a of the short sleeve 60 is brought into abutment with the end faces 50a of the strap portions, the hook portions 58 and 59 of each pair of engaging segments 54 and 55 are brought into engagement with the lower end of a respective frame member 62, so that the sleeve 60 can be firmly secured to the strap portions of the grid cell 51.

Thus, in the grid of the present embodiment, the same advantages as in the previous embodiment can be obtained.

Figure 5:
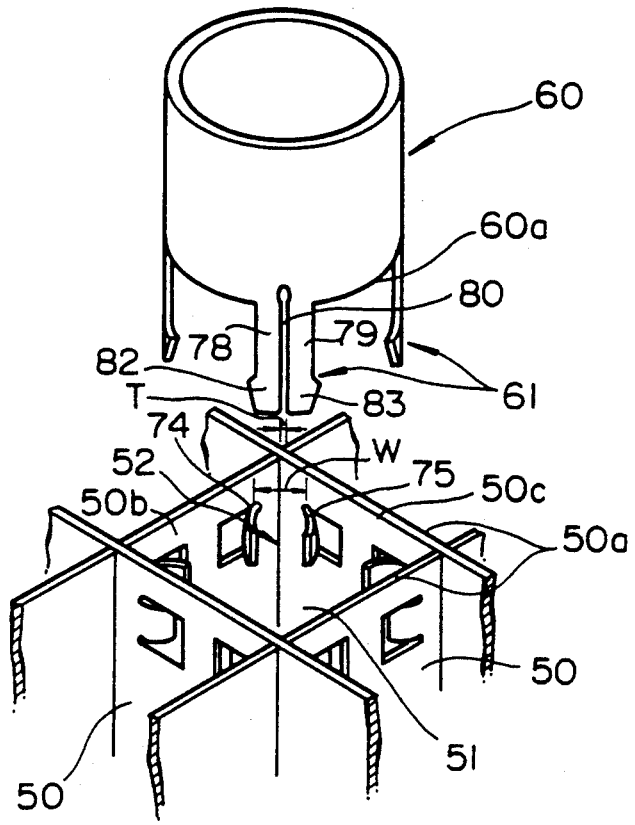
FIG. 5 is a view similar to FIG. 1, but showing a grid in accordance with a third embodiment of the invention.
Figure 6:
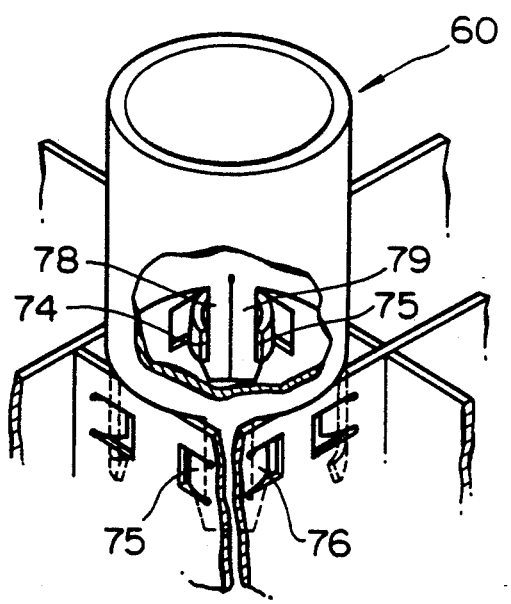
FIG. 6 is a view similar to FIG. 5, but showing the state in which the short sleeve is secured to the grid cell.

FIGS. 5 and 6 depict a grid in accordance with a third embodiment of the invention. In this embodiment, each first engaging portion 52 formed on the straps 50 is comprised of an opposed pair of protruding members 74 and 75 formed on the inner surfaces of the strap portions adjacent to the corner into which the wall portions 50b and 50c merge. Each protruding member 74, 75 is formed by cutting that portion adjacent to the corner into a channel shape and bending the cut portion inwardly of the grid cell 51 so as to have a face slightly curving concavely in a direction toward the opposed protruding member.

The second engaging portion 61 formed on the short sleeve 60 is comprised of a pair of elongated engaging segments 78 and 79 extending downwardly from the end of the sleeve 60 so as to be flush with the outer peripheral surface thereof. These engaging segments 78 and 79 define a slit or cut-out portion of width T therebetween, whereby they are resiliently deformable in the opposing directions. Furthermore, the engaging segments 78 and 79 respectively include hook portions 82 and 83 protruding in directions away from each other, and each hook portion 82, 83 has an inclined face sloping downwardly in a direction toward the cut-out portion 80. In addition, the total length of the widths of the ends of the hook portions 82 and 83 is set so as to be smaller than the distance W between the opposed protruding members 74 and 75.

When securing the short sleeve 60 to either the upper or lower opening end of the grid cell 51, the short sleeve 60 is first arranged in such a manner that the four pairs of engaging segments 78 and 79 of the sleeve 60 correspond to the four pairs of protruding members 74 and 75, respectively, and is moved toward the strap portions so that each second engaging portion is inserted in the holding space of a respective first engaging portion. Thus, the inclined faces of the hook portions 78 and 79 are brought into abutting contact with the inner sides of the protruding members 74 and 75, and the engaging segments 78 and 79 are resiliently deformed in the opposing directions. Further, as shown in FIG. 6, when the bottom 60a of the short sleeve 60 reaches the end faces 50a of the straps 50, the engaging segments are restored to their original states. Thus, the hook portions 78 and 79 are caused to protrude downwardly from the protruding members 74 and 75, and are held in engagement with the lower ends thereof.

As described above, when the sleeve 60 is moved in such a manner that the second engaging portions are inserted in the holding spaces defined by the first engaging portions, respectively, the second engaging portions and the first engaging portions are brought into engagement with each other, so that the sleeve 60 can be firmly secured to the grid cell 51.

Figure 7:
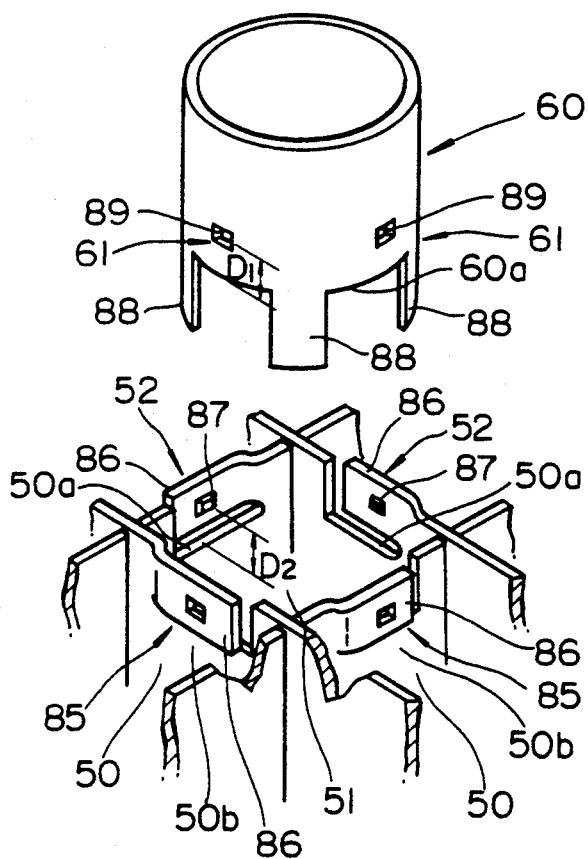
FIG. 7 is a view similar to FIG. 1, but showing a grid in accordance with a fourth embodiment of the invention.
Figure 8:
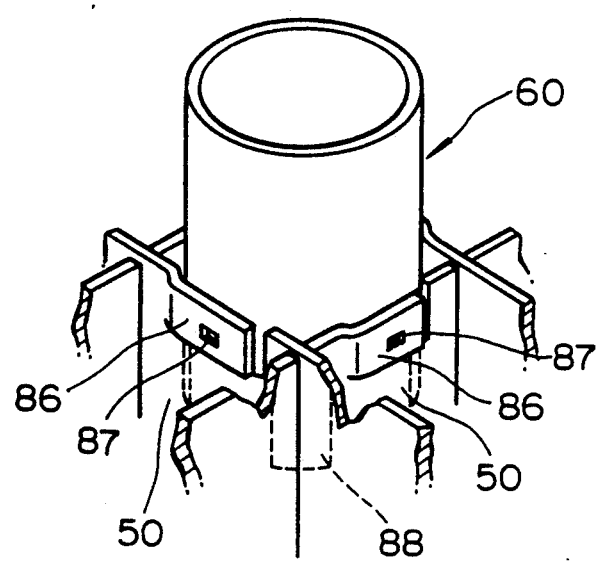
FIG. 8 is a view similar to FIG. 7, but showing the state in which the short sleeve is secured to the grid cell.
Figure 9:
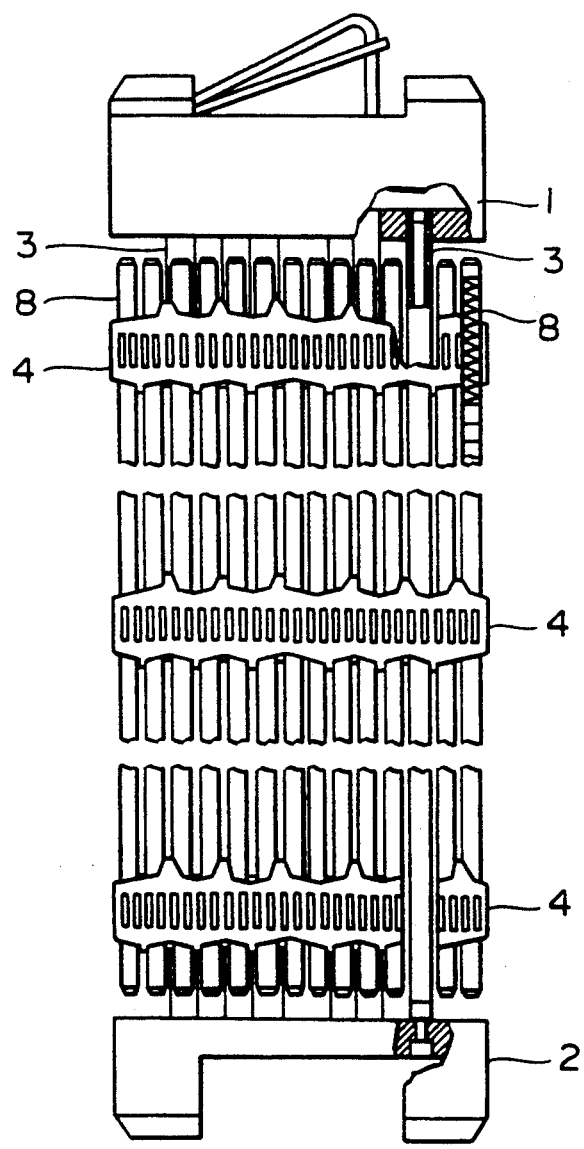
FIG. 9 is a front elevational view of a nuclear fuel assembly for a pressurized water reactor.
Figure 10:
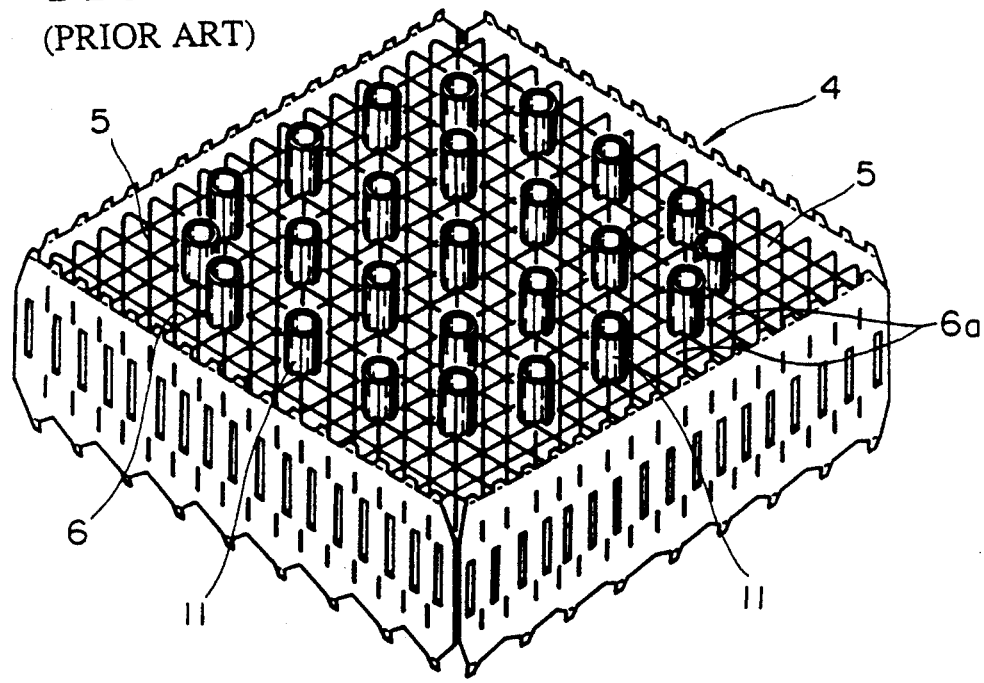
FIG. 10 is a perspective view of a conventional grid.
Figure 11:
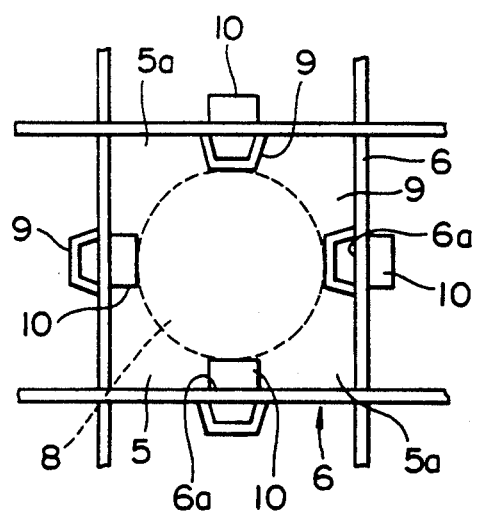
FIG. 11 is a top plan view of the grid cell of the grid in FIG. 10.
Figure 12:
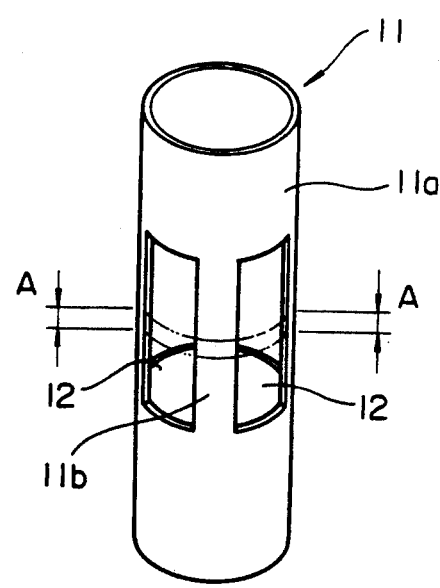
FIG. 12 is a perspective view of a conventional sleeve.

FIGS. 7 and 8 depict a grid in accordance with a fourth embodiment of the invention. In this embodiment, each first engaging portion 52, formed on the strap 50 includes a protruding member 86 of a generally L-shape as viewed transversely of the strap. Each protruding member 86 is formed by cutting the end portion of the strap 50 in an L-shaped manner and bending the cut portion outwardly, whereby the protruding member is formed so as to be resiliently deformable in the direction of the thickness of the strap. In addition, each protruding member 86 has a protrusion 87 formed on the center of the inner side thereof so as to protrude inwardly of the grid cell.

Furthermore, the second engaging portions 61 formed on the short sleeve 60 are comprised of four recesses 89 formed on the outer peripheral surface thereof so as to correspond to the protrusions 84, respectively. In addition, the short sleeve 60 has four legs 88 extending vertically downwardly so as to be flush with the outer peripheral surface. The recess 89 is formed slightly greater in size than the protrusion 87, and the length $D_1$ between the recess 89 and the bottom 60a of the sleeve 60 is set identical to the distance $D_2$ between the protruding member 86 and the protrusion 87.

When securing the short sleeve 60 to either the upper or lower opening end of the grid cell 51, the short sleeve 60 is first moved in such a manner that the four legs 88 of the sleeve 60 correspond to the corner portions of the straps 50. Then, the protruding members 86 on the straps 50 are pressed by the outer peripheral surface of the sleeve 60 to be resiliently deformed outwardly from the grid cell 51. Further, as shown in FIG. 8, when the bottom 60a of the short sleeve 60 is brought into abutment with the end faces 50a of the straps 50, the protruding members 86 are restored to their original state, and the protrusions 87 are fitted in their respective recesses 89.

Thus, when the sleeve is inserted in such a manner that the protruding members 86 having protrusions 87 are opposed to the recesses 89 of the sleeve, 60, respectively, the protrusions 87 are fitted into the recesses 89, respectively, so that the short sleeves 60 can be firmly secured to the opening ends of the grid cell 51.

In the above embodiments, the engaging segments 54, 55, 78, 79 may be formed such that the hook portions 58, 59, 82, 83 has an inclined corner at its lower portion. With this construction, the fitting of these members into the frame members 62 or the protruding members 74 and 75 can be made easier.

Obviously many modifications and variations of the present invention are possible in the light of the above teachings. It is therefore to be understood that within the scope of the appended claims, the invention may be practiced otherwise than as specifically described.

What is claimed is:

1. A grid in a nuclear fuel assembly for supporting fuel rods and thimbles, comprising:
   a plurality of elongated straps intersecting perpendicularly with each other to define a plurality of first grid cells for supporting the fuel rods and a plurality of second grid cells for supporting the thimbles, each of said grid cells having a prescribed intervening distance defined between the opposed straps, those portions of said straps defining a respective one of said grid cells having opposite ends defining opposite opening ends of said respective grid cell;
   a plurality of cylindrical sleeves each arranged on at least one of said opposite ends of said strap portions defining said respective second grid cell and having an inner diameter generally identical to said intervening distance; and
   engaging means for securing each of said sleeves to said strap portions defining said second grid cell, said engaging means including at least one first engaging portion provided on said strap portions defining said second grid cell adjacent one of said opposite ends and at least one second engaging portion provided on said sleeve adjacent an axial bottom thereof, said first and second engaging portions being formed such that said first and second engaging portions are held in resilient engagement with each other when said axial bottom is held in abutment with said one of said opposite ends, wherein said second engaging portions do not extend to the other of said opposite ends when said axial bottom is held in abutment with said one of said opposite ends.

2. A grid according to claim 1, in which each of said sleeves includes an end face and is received on said strap portions defining said respective second grid cell, with said end face resting on said ends of said strap portions.

3. A grid according to claim 1, in which said first engaging portion includes a pair of engaging segments formed on said ends of said strap portions defining said second grid cell so as to define a cut-out portion therebetween in such a manner that said segments are resiliently deformable towards each other, said second engaging portion including a frame member formed on an outer peripheral surface of said sleeve so as to protrude outwardly thereof and defining therebetween a holding space in which said first engaging portion is inserted, whereby when inserted in said holding space of said frame member, said pair of engaging segments are first deformed resiliently by said frame member, and are then restored to their original states to be immovably fixed to said frame member.

4. A grid according to claim 3, in which said frame member is of a channel shape as viewed longitudinally of said sleeve, each of said engaging segments extending in a direction away from said ends of said strap portions therealong and including a hook portion formed at a distal end thereof, said hook portion having an inclined surface sloping toward said distal end toward said cut-out portion.

5. A grid according to claim 1, in which said first engaging portion includes a frame member formed on an outer peripheral surface of said strap portions defining said second grid cell so as to protrude outwardly and defining therebetween a holding space in which said second engaging portion is inserted, said second engaging portion including a pair of engaging segments formed on an outer peripheral surface of said sleeve so as to define a cut-out portion therebetween in such a manner that said segments are resiliently deformable towards each other, whereby when inserted in said holding space of said frame member, said pair of engaging segments are first deformed resiliently by said frame member, and are then restored to their original states to be immovably fixed to said frame member.

6. A grid according to claim 5, in which said frame member is of a channel shape as viewed transversely of said strap, each of said engaging segments extending in a longitudinal direction of said sleeve away from an end thereof, and including a hook portion at a distal end thereof, said hook portion having an inclined surface sloping toward said distal end toward said cut-out portion.

7. A grid according to claim 1, in which said first engaging portion includes an opposed pair of protruding members formed on inner surfaces of said strap portions defining said second grid cell so as to protrude inwardly and defining therebetween a holding space in which said second engaging portion is inserted, said second engaging portion including a pair of engaging segments formed on an outer peripheral surface of said sleeve so as to define a cut-out portion therebetween in such a manner that said segments are resiliently deformable towards each other, whereby when inserted in said holding space of said frame member, said pair of engaging segments are first deformed resiliently by said frame member, and are then restored to their original states to be immovably fixed to said frame member.

8. A grid according to claim 7, in which said pair of protruding members have surfaces concavely curving towards each other, each of said engaging segments extending in a longitudinal direction of said sleeve away from an end thereof and including a hook portion at a distal end thereof, said hook portion having an inclined surface sloping toward said distal end toward said cut-out portion.

9. A grid according to claim 1, in which said first engaging portion includes a protruding member of a generally L-shape as viewed transversely of the strap and formed on at least one of the outer peripheral surfaces of said strap portions defining said second grid cell so as to protrude outwardly and a protrusion formed on an inner face of said protruding member, said protruding member defining a holding space in which said second engaging portion is inserted, said second engaging portion including a recess formed on an outer peripheral surface of the sleeve, whereby when said sleeve is inserted in said holding space of said protruding member, said protruding member is first deformed resiliently by said protrusion, and then said protrusion is fitted in said recess to cause said protruding member to be restored to its original position.

10. A grid according to claim 9, in whcih said strap portions defining said second grid cell includes a bearing face disposed adjacent to said protruding member, said sleeve including an end face and being received on said strap portions defining said second grid cell, with said end face resting on said bearing face of said strap portions.

11. A grid in a nuclear fuel assembly for supporting fuel rods and thimbles, comprising:

a plurality of elongated straps intersecting perpendicularly with each other to define a plurality of first grid cells for supporting the fuel rods and a plurality of second grid cells for supporting the thimbles, each of said grid cells having a prescribed intervening distance defined between the opposed straps, those portions of said straps defining a respective one of said grid cells having opposite ends defining opposite opening ends of said respective grid cell;

a plurality of cylindrical sleeves each arranged on at least one of said opposite ends of said strap portions defining said respective second grid cell and having an inner diameter generally identical to said intervening distance; and engaging means for securing each of said sleeves to said strap portions defining said second grid cell, said engaging means including at least one first engaging portion provided on said strap portions defining said second grid cell and at least one second engaging portion provided on said sleeve, said first and second engaging portions being held in resilient engagement with each other, in which said first engaging portion includes a pair of engaging segments formed on said ends of said strap portions defining said second grid cell so as to define a cut-out portion therebetween in such a manner that said segments are resiliently deformable towards each other, said second engaging portion including a frame member formed on an outer peripheral surface of said sleeve so as to protrude outwardly thereof and defining therebetween a holding space in which said first engaging portion is inserted, wherein when inserted in said holding space of said frame member, said pair of engaging segments are first deformed resiliently by said frame member, and are then restored to their original states to be immovably fixed to said frame member, in which said frame member is of a channel shape as viewed longitudinally of said sleeve, each of said engaging segments extending in a direction away from said ends of said strap portions therealong and including a hook portion formed at a distal end thereof, said hook portion having an inclined surface sloping toward said distal end toward said cut-out portion.

12. A grid in a nuclear fuel assembly for supporting fuel rods and thimbles, comprising:

a plurality of enlongated straps intersecting perpendicularly with each other to define a plurality of first grid cells for supporting the fuel rods and a plurality of second grid cells for supporting the thimbles, each of said grid cells having a prescribed intervening distance defined between the opposed straps, those portions of said straps defining a respective one of said grid cells having opposite ends defining opposite opening ends of said respective grid cell;

a plurality of cylindrical sleeves each arranged on at least one said opposite ends of said strap portions defining said respective second grid cell and having an inner diameter generally identical to said intervening distance; and engaging means for securing each of said sleeves to said strap portions defining said second grid cell, said engaging means including at least one first engaging portion provided on said strap portions defining said second grid cell and at least one second engaging portion provided on said sleeve, said first and second engaging portions being held in resilient engagement with each other, in which said first engaging portion includes a frame member formed on an outer peripheral surface of said strap portions defining said second grid cell so as to protrude outwardly and defining therebetween a holding space in which said second engaging portion is inserted, said second engaging portion including a pair of engaging segments formed on an outer peripheral surface of said sleeve so as to define a cutout portion therebetween in such a manner that said segments are resiliently deformable towards each other, whereby when inserted in said holding space of said frame member, said pair of engaging segments are first deformed resiliently by said frame member, and are then restored to their original states to be immovably fixed to said frame member, in which said frrame member is of a channel shape as viewed transversely of said strap, each of said engaging segments extending in a longitudinal direction of said sleeve away from an end thereof, and including a hook portion at a distal end thereof, said hook portion having an inclined surface sloping toward said distal end toward said cut-out portion.

13. A grid in a nuclear fuel assembly for supporting fuel rods and thimbles, comprising:

a plurality of elongated straps intersecting perpendicularly with each other to define a plurality of first grid cells for supporting the fuel rods and a plurality of second grid cells for supporting the thimbles, each of said grid cells having a prescribed intervening distance defined between the opposed straps, those portions of said straps defining a respective one of said grid cells having opposite ends defining opposite opening ends of said respective grid cell;

a plurality of cylindrical sleeves each arranged on at least one of said opposite ends of said strap portions defining said respective second grid cell and having an inner diameter generally identical to said intervening distance; and engaging means for securing each of said sleeves to said strap portions defining said second grid cell, said engaging means including at least one first engaging portion provided on said strap portions defining said second grid cell and at least one second engaging portion provided on said sleeve, said first and second engaging portions being held in resilient engagement with each other, in which said first engaging portion includes an opposed pair of protruding members formed on inner surfaces of said strap portions defining said second grid cell so as to protrude inwardly and defining therebetween a holding space in which said second engaging portion is inserted, said second engaging portion including a pair of engaging segments formed on an outer peripheral surface of said sleeve so as to define a cut-out portion therebetween in such a manner that said segments are resiliently deformable towards each other, whereby when inserted in said holding space of said frame member, said pair of engaging segments are first deformed resiliently by said frame member, and are then restored to their original states to be immovably fixed to said frame member, in which said pair of protruding members have surfaces concavely curving towards each other, each of said engaging segments extending in a longitudinal direction of said sleeve away from an end thereof and including a hook portion at a distal end thereof, said hook portion having an inclined surface sloping toward said distal end toward said cut-out portion.

14. A grid in a nuclear fuel assembly for supporting fuel rods and thimbles, comprising:

a plurality of elongated straps intersecting perpendicularly with each other to define a plurality of first grid cells for supporting the fuel rods and a plurality of second grid cells for supporting the thimbles, each of said grid cells having a prescribed intervening distance defined between the opposed straps, those portions of said straps defining a respective one of said grid cells having opposite ends defining opposite opening ends of said respective grid cell;

a plurality of cylindrical sleeves each arranged on at least one of said opposite ends of said strap portions defining said respective second grid cell and having an inner diameter generally identical to said intervening distance; and engaging means for securing each of said sleeves to said strap portions defining said second grid cell, said engaging means including at least one first engaging portion provided on said strap portions defining said second grid cell at at least one second engaging portion provided on said sleeve, said first and second engaging portions being held in resilient engagement with each other, in which said first engaging portion includes a protruding member of a generally L-shape as viewed transversely of the strap and formed on at least one of the outer peripheral surfaces of said strap portions defining said second grid cell so as to protrude outwardly and a protrusion formed on an inner face of said protruding member, said protruding member defining a holding space in which said second engaging portion is inserted, said second engaging portion including a recess formed on an outer peripheral surface of the sleeve, whereby when said sleeve is inserted in said holding space of said protruding member, said protruding member is first deformed resiliently by said protrusion, and then said protrusion is fitted in said recess to cause said protruding member to be restored to its original position.

15. A grid according to claim 14, in which said strap portions defining said second grid cell includes a bearing face disposed adjacent to said protruding member, said sleeve including an end face and being received on said strap portions defining said second grid cell, with said end face resting on said bearing face of said strap portions.

* * * * *